H. W. OSTER.
ATTACHMENT FOR LATHES.
APPLICATION FILED AUG. 1, 1912.

1,139,063.

Patented May 11, 1915.

UNITED STATES PATENT OFFICE.

HERMAN W. OSTER, OF CLEVELAND, OHIO, ASSIGNOR TO THE OSTER MANUFACTURING COMPANY, OF CLEVELAND, OHIO, A CORPORATION OF OHIO.

ATTACHMENT FOR LATHES.

1,139,063.     Specification of Letters Patent.     Patented May 11, 1915.

Application filed August 1, 1912. Serial No. 712,664.

*To all whom it may concern:*

Be it known that I, HERMAN W. OSTER, a citizen of the United States, residing at Cleveland, in the county of Cuyahoga and State of Ohio, have invented a certain new and useful Improvement in Attachments for Lathes and the like, of which the following is a full, clear, and exact description.

This invention relates to a tool or attachment for lathes and the like, for impressing characters in metal.

At the present time, it is customary for manufacturers to impress characters or markings into the face of metal stock or work chiefly by a punching operation, after the work is removed from the machine in which it is formed, made or operated upon. If the impressing is done by a punch, the work is more or less slow and the impressions are usually uneven and otherwise unsatisfactory. Other previously known methods of impressing characters in metal are objectionable for the reason that the work into which the impressions are made must be placed in a separate machine or apparatus for this purpose and the impressing is done by a process which is usually expensive, difficult to carry out, or unsatisfactory in results obtained.

The object of my invention is to provide a character impressing tool in the form of an attachment to the lathe or other machine in which the work is operated on and of a nature such that the desired characters or markings can be impressed into the work quickly, easily and neatly, and while the work is still in such machine.

My invention may be briefly summarized as consisting in certain novel details of construction, combinations and arrangements of parts which will be described in the specification and set forth in the appended claim.

Figure 1:
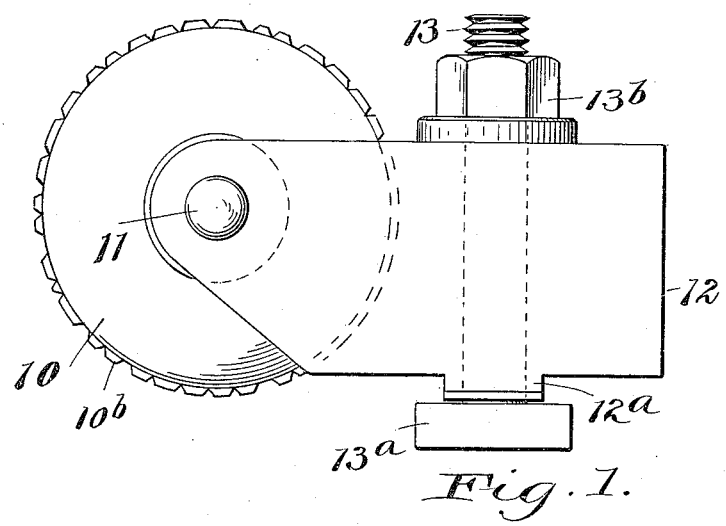
Figure 2:
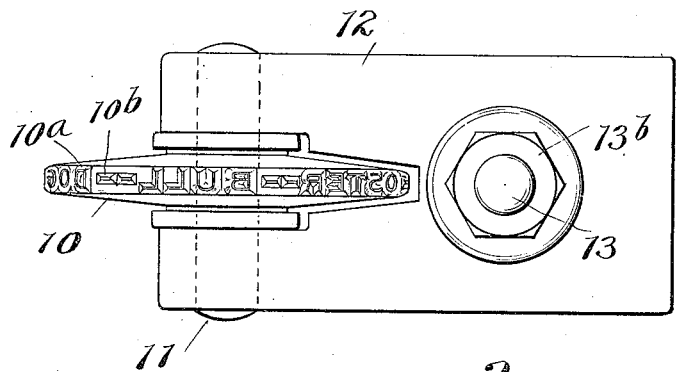

In the drawing in which I have shown one form of my invention, Figure 1 is a side elevation of the tool embodying my invention; and Fig. 2 is a top plan view of the same.

The tool includes a die 10 in the form of a circular disk which is rotatably supported upon a pin or stud 11 mounted in the jaws of a bifurcated holder 12, which is to replace the ordinary tool holder of a machine such as a lathe or planer. This holder is designed to be attached to that part of the machine which indirectly holds the ordinary cutting tool of such machine which may be the carriage of an ordinary lathe, or a tool turret of a turret lathe. In the present form of my invention, for the purpose of attaching the holder to the tool carrying part of such machine, the holder 12 is provided on its lower face with a rectangular projection $12^a$ which is adapted to have a sliding fit in one of the ways of the part of the machine which receives the tool holder, and is designed to be clamped in any position to which it may be adjusted by means of a bolt 13 having at its lower end a rectangular head $13^a$ adapted to slide along the groove of the part to which the holder is attached, and having at its upper end a tightening nut $13^b$.

The die 10 has on its periphery raised letters or other characters $10^a$ which are to be impressed in the work which is to receive the impressions, and are preferably tapered outwardly so as to have at their outer ends more or less of a cutting edge. Inasmuch as the die is to be rotated on its bearing by contact with the moving work, in case the letters on the periphery of the die are spaced a very considerable distance apart, I place on the periphery in the space between such letters a suitable number of projections $10^b$ which serve to preserve the driving relationship between the work and the die.

This attachment is employed in the following manner: While the work is in the lathe or planer in which it is operated upon by the cutting tools normally employed, the cutting tool and its holder are removed from the machine in case the machine has provision for receiving at one time a single cutting tool, and the impressing tool and its holder are placed in position on the support for the tool holder. In case the attachment is used on a turret lathe, the impressing tool may be permanently mounted on the tool turret. Thence, while the work is being rotated in the lathe, or reciprocated on the planer bed, the tool holder is brought to proper position, so as to bring the periphery of the die up against the face of the work at the point where the impressions are to be made. Thence the die is held against the work with sufficient pressure to cause frictional driving engagement between the work and the die, and rotation of the latter, and to cause the characters on the periphery of the die to cut into the work,—the teeth-like characters or projections on the die maintaining the driving and driven parts in constant driving relationship. The characters may be impressed in a rotating flat surface or in a longitudinally moving flat surface, or they may be impressed in a rotating annular surface.

In case the impressions are made on a flat rotating part, the die should engage the flat surface of the rotating work at a distance from the center of rotation equal to the radius of the die, or what may be termed the pitch radius of the impressing characters, and in case the characters are impressed in a rotating annular surface, the die and work should be of the same diameter, so that the engaging parts of the die and work will travel at the same peripheral or angular speed. The work may then be rotated with the die in driving relationship therewith any desired number of times, which will depend largely upon the depth that the characters are to cut into the work, and the cutting characters will, at each revolution, always register with the corresponding impressions.

By the term "lathe" in the claim, I aim to cover all such machines wherein the work while being held in a chuck or other workholder, is rotated and operated on by a relatively stationary cutting or working tool.

Having thus described my invention, what I claim is:

An attachment for a lathe or planer, comprising a holder having means for attaching the same to the tool-carrying part of such machine, an annular die rotatably mounted in said holder, said die having on its periphery raised characters tapered toward their outer ends or edges and adapted to be impressed in the moving work held in such machine, when the die is brought up against such work and is driven thereby, and said die having on its periphery between certain of said characters spaced projecting ribs, each of which extends circumferentially a short distance around the die in a plane at right angles to the axis of the die, the function of said projecting ribs being to maintain the die and work in driving relationship.

In testimony whereof, I hereunto affix my signature in the presence of two witnesses.

HERMAN W. OSTER.

Witnesses:
R. B. TEWKSBURY,
M. R. SPAYD.

Copies of this patent may be obtained for five cents each, by addressing the "Commissioner of Patents, Washington, D. C."